United States Patent [19]

Scott et al.

[11] Patent Number: 4,683,167
[45] Date of Patent: Jul. 28, 1987

[54] MAGNETIC IRON OXIDE PIGMENT AND RECORDING MEDIA

[75] Inventors: Lawrence M. Scott, Newark; Gary D. Rexroat, Oakland, both of Calif.

[73] Assignee: Ampex Corporation, Redwood City, Calif.

[21] Appl. No.: 623,910

[22] Filed: Jun. 25, 1984

[51] Int. Cl.⁴ ............................................. G11B 5/706
[52] U.S. Cl. ............................... 428/328; 252/62.54; 252/62.56; 427/127; 427/128; 427/130; 427/132; 428/329; 428/403; 428/694; 428/900
[58] Field of Search ............... 428/694, 900, 328, 329, 428/403; 427/132, 130, 127, 128; 252/62.54, 62.56

[56] References Cited

U.S. PATENT DOCUMENTS

| | | | |
|---|---|---|---|
| 3,574,685 | 4/1971 | Haines | 427/132 |
| 4,064,292 | 12/1977 | Schoenafinger | 427/132 |
| 4,125,474 | 11/1978 | Dezawa | 427/127 |
| 4,188,302 | 2/1980 | Becker | 427/127 |
| 4,287,233 | 9/1981 | Rudolf | 427/127 |
| 4,296,149 | 10/1981 | Rudolf | 427/127 |
| 4,321,302 | 3/1982 | Umeki | 427/127 |
| 4,414,245 | 11/1983 | Miyazawa | 427/127 |
| 4,457,955 | 7/1984 | Okamura | 427/127 |
| 4,539,261 | 9/1985 | Nakata | 428/403 |

Primary Examiner—Ellis P. Robinson
Attorney, Agent, or Firm—Kate H. Murashige; Ralph L. Mossino; Joel D. Talcott

[57] ABSTRACT

An improved magnetic particulate pigment suitable for use in recording media and media employing it are disclosed. The particles of the pigment comprise a magnetic core with an epitaxial layer containing approximately 0.05–2.0% of the total pigment as zinc ion. A process for preparing such particles is also disclosed.

17 Claims, No Drawings

MAGNETIC IRON OXIDE PIGMENT AND RECORDING MEDIA

TECHNICAL FIELD

The invention relates to the field of magnetic recording, in particular, magnetically recording information on suitable media such as on audio or video tapes and discs. In particular, the invention relates to the preparation of a magnetic iron oxide pigment with superior properties suitable for magnetically recording media and to media incorporating the pigment.

BACKGROUND ART

The production of magnetic recording materials requires the coating of a suitable backing with a multiplicity of magnetic domains. Typically, these domains are comprised of acicular particles whose magnetic moments are capable of responding to an externally applied magnetic field. The ability of these domains to respond in a desired way can be measured by several established parameters. Three important parameters of this type are saturation magnetization, coercivity, and squareness. These measure, respectively, the degree of saturation magnetization that can be obtained, the ability of the imposed magnetization to be maintained (rather than lost through the influence of adjacent domains) and the ability of the recorded medium to retain the signal in memory. All of these properties can be measured using standard methods, and provide a measure of the quality of recording which can be obtained on the medium.

A variety of materials have been used to provide the magnetic domains. Among these are chromium oxides, magnetic iron oxides, and metallic iron.

It has long been known that precipitation of iron(II) hydroxide in the presence of air results in a non-magnetic "alpha" form of ferric oxide which can, in turn, be converted to $Fe_3O_4$ or magnetite through reduction by hydrogen or other suitable reducing agents. The resulting magnetite is, of course, magnetic but as it does not have desirable stability properties needed for preparing suitable recording media, it is then oxidized to the more stable "gamma" form of ferric oxide. Because magnetic or "gamma" $Fe_2O_3$ is a cubic structure, it is difficult to prepare directly the desired acicular particles of this magnetic form of the oxide. The usual procedure is first to prepare the alpha (non-magnetic) form, (as above) which does easily form acicular particles, and then to convert this to the gamma (magnetic) form while retaining the physical shape of the original particles.

Various modifications of the foregoing scheme have been used to produce the magnetic particles, and a number of attempts have been made to optimize this preparation process. For example, U.S. Pat. No. 3,931,025 describes a magnetic iron oxide pigment containing both zinc and phosphate ions. The pigment prepared according to the disclosure of this reference is obtained by growing the alpha form of ferric oxide from a solution containing iron(II), zinc ion, and phosphate ion under conditions of oxidation. The presence of zinc and phosphate appeared to result in enhanced acicularity as ascertained by the length/width ratio of the particles, and to reduce the noise level associated with tapes prepared from them.

U.S. Pat. No. 4,321,302 discloses, as an incidental matter, the addition of zinc ion to the reaction mixture used in the original formation of the alpha ferric oxide; the improvement disclosed by this reference comprises the addition of silicate and phosphate ions to the original precipitating mixture. According to this reference, the presence of zinc ion appears to lower the coercivity of the resulting particles.

U.S. Pat. No. 3,912,646 also discloses the addition of modifying ions, including zinc ion, to the original solution used to obtain the alpha ferric oxide precipitate. The improvements which are the subject of U.S. Pat. No. 3,912,646, however, relate to the conditions of conversion of the alpha form to the magnetic gamma $Fe_2O_3$.

In all of the foregoing cited references, zinc atoms or ions are retained in some form in the final composition. It is not clear from these references what, if any, influence the presence of zinc has on the magnetic properties of the particles obtained. In all cases, the zinc is included in the original alpha oxide precipitating solution.

Other modifications have been made by coating the gamma ferric oxide with metals or salts. U.S. Pat. No. 4,067,755 describes the provision of an alloy of cobalt and another element, which element may be zinc, as a coating on magnetic particles composed of either magnetite or gamma ferric oxide. The process comprises reduction of precipitated ions to the metallic form to obtain the alloy. Another coating which has proved helpful is the precipitation of both iron(II) oxide and cobalt(II) oxide onto the surface of a previously prepared acicular form of gamma $Fe_2O_3$. The resulting particles retain their acicular character but contain a gamma $Fe_2O_3$ core surrounded by an epitaxial layer composed of the oxides of iron and cobalt, the epitaxial layer having a crystal structure which appears to enhance the desirable magnetic properties of the particles. See, e.g., Hayama, F., et al, *Ferrites: Proc. of Intl. Conf.*, Sept-Oct, 1980, Japan.

DISCLOSURE OF THE INVENTION

It has now been found that the addition of zinc ion to iron/cobalt ion solutions used to provide the epitaxial layer surrounding a previously prepared magnetic core results in a marked improvement in the saturation magnetization of the resulting particles without unacceptably sacrificing the squareness or coercivity. The coated particles thus contain a small percentage of zinc ion in the epitaxial (cortical) layer, as well as the magnetically enhancing amounts of epitaxial cobalt and iron oxides provided by the precipitating solution.

Accordingly, in one aspect, the invention relates to a magnetic recording medium having superior saturation magnetization properties comprising a support and a magnetic particulate pigment comprising a magnetic, typically gamma-$Fe_2O_3$, core, and a cobalt oxide/iron oxide epitaxial layer, such layer containing a magnetic saturation enhancing percentage of zinc ion.

In other aspects, the invention relates to a process for preparing the recording medium, to the improved pigment, and to a process for preparing the pigment which comprises suspending magnetic particles in aqueous medium, and precipitating cobalt(II) hydroxide onto the particles, followed by precipitating iron(II) hydroxide, wherein at least one of these precipitations takes place in the presence of zinc ion.

MODES OF CARRYING OUT THE INVENTION

A. Definitions

All percentages used in the description of the invention are defined and expressed in terms of "At%", i.e., the total mole (atomic) percent, unless specifically stated otherwise. They are calculated from precipitating solution concentrations using the assumption that precipitation of the iron, cobalt, and zinc ions to provide the epitaxial layer is complete. Thus, the basis, or denominator, is the total number of moles of metal atom nuclei provided by the gamma-$Fe_2O_3$ or other magnetic core particle plus the numbers of moles of iron, cobalt, and zinc nuclei provided by the precipitating solutions. The percentages of epitaxial iron, cobalt, and zinc ions are thus the number of moles of each, respectively, provided by the solution used to provide the epitaxial layer, divided by the aforesaid basis and multiplied by 100.

It will be understood that the description of the particles of the invention in terms of particular oxidation states and forms of iron, cobalt, and zinc represent approximations, due to possible surface layer interactions between the core and the precipitated oxides. The nature of the incipient surface layer is not at present understood, and the description therefore reads on the expected configuration of the resulting layered particles, and does not take account of boundary layer or modifications which may occur in the course of the described process.

The magnetic properties used as a measure of quality are defined as follows:

"Saturation magnetization" symbolized by sigma is measured in emu/g and provides a measure of the capacity of the particles to record magnetic signals. Typical values for saturation magnetization are in the range of 60-80 emu/g with higher values representing more desirable properties. A "saturation magnetization enhancing" amount of zinc ion is an amount which results in an increase in saturation magnetization without unacceptable effects on other measures of recording quality.

Coercivity ($H_c$) measured in orsteds (Oe) is a measure of the strength of the magnetic field required to reverse the magnetic domain of an individual particle. Values in the range of 400-800 are generally obtained.

Squareness (Sq) is a measure of the ability of the recording medium to retain the recording signal in memory. Higher values for Sq signify a higher remanant magnetization and superior signal output, as characterized by sharper magnetic flux transitions. This permits high signal packing in digital recording.

All of the foregoing properties are measured using both the powders and an oriented magnetic tape in a vibrating sample magnetometer (VSM).

B. Process of the Invention

In the process of the invention, magnetic particles, such as, for example, particles of magnetite, chromium oxide, acicular particles of gamma-$Fe_2O_3$, or magnetic iron, preferably gamma-$Fe_2O_3$, are suspended in an aqueous medium. The suspension is kept under an inert gas atmosphere, such as nitrogen or helium, preferably nitrogen, and is maintained in an acidic condition by the addition of a suitable acid such as, for example, sulfuric or hydrochloric acid so that the hydrogen ion concentration of the solution is on the order of 1-10 mM preferably around 2 mM. To this suspension is added cobalt-(II) ion sufficient to supply about 2-10 At%, preferably about 5 At% cobalt oxide, in the form of a suitable salt such as cobalt(II) sulfate, cobalt(II) chloride, or cobalt-(II) acetate, preferably cobalt(II) sulfate. The slurry itself contains about 5-10 g/liter of the cobalt salt. The slurry is then agitated for about a half hour to 3 hours, preferably around an hour, at room temperature before being made basic by the addition of a solution containing a suitable base such as sodium hydroxide or potassium hydroxide, preferably sodium hydroxide, to obtain an initial hydroxide ion concentration of approximately 1-5 M, preferably around 2 M.

After the completion of base addition, a solution containing an iron(II) salt such as iron(II) chloride or iron(II) sulfate, preferably iron(II) sulfate is then added. It may be desirable to make the added solution slightly acidic so as to maintain the solubility of the iron salts, although the amount of acid must be sufficiently small so as not to prevent the precipitation of the desired hydroxides. The amount of iron(II) in the added solution should be sufficient to provide between about 2-10 At% epitaxial iron ion, preferably around 5 At%; the added solution itself contains on the order of 100-800 g/liter of the iron(II) salt.

According to the method of the invention, at least one of the cobalt salt solution or the iron salt solution is supplemented with zinc ion. Preferably, only the iron salt solution is thus supplemented. The zinc is supplied as a zinc salt such as, for example, zinc chloride, acetate, or sulfate, preferably acetate, sufficient to provide a saturation enhancing amount, usually between about 0.05 At% and about 2 At% epitaxial zinc ion, preferably around 0.25-1.0 At% and most preferably about 0.5 At%. The zinc ion containing solution itself contains zinc salt on the order of 9-80 g/liter of the zinc salt.

After the addition of the iron(II), in order to effect curing, the temperature of the reaction mixture is raised to about 150°-250° F., preferably to around 190° F. and the slurry maintained at this temperature for 15 minutes to several hours, preferably around an hour. The temperatures required in this step are variable and depend at least in part on the alkalinity of the solution wherein precipitation occurs. In general, a higher alkalinity permits lower temperatures. The slurry is then allowed to cool, and the solids recovered, preferably by filtration and dried at high temperature of about 180°-250° F., preferably around 225° F. The drying takes place over several hours, if agitation is provided to expose greater amounts of surface area. Drying is preferably conducted under inert atmosphere conditions, such as under nitrogen gas.

The dried powder can then be used to prepare the magnetic coating for recording surfaces using standard processing techniques. Such techniques, which are well known in the art, comprise applying a dispersion of the magnetic pigment onto a non-magnetic support such as, for example, a synthetic film, tape or disc, and then drying the composite. The dispersion is made by suspending and dispersing the pigment in any commonly used solvent/binder solution.

The improved particles of the invention, both as a powder and when applied to support, retain, as a core, the original magnetic particles used in the slurry, surrounded by an epitaxial coating comprising a layer of cobalt oxide enveloped by a layer of iron oxide, which coating also contains zinc oxide. The resulting particles typically have a composition, contained in the epitaxial coating which is in the range of 2-10 At%, preferably 5 At% each, of iron(II) and cobalt(II) and contain zinc ion in the range of 0.05%-2.0%, preferably around 0.25%-1.0%, and most preferably around 0.5%. They are characterized by levels of coercivity and squareness comparable to, i.e., not unacceptably inferior to, those of similar particles containing no zinc ion, and by a magnetic saturation advantageously above that obtained in comparable particles lacking zinc ion.

The following specific example is set forth for purposes of illustration, and does not limit the invention.

EXAMPLE

A. 4.54 kg of gamma-$Fe_2O_3$, along with 73 liters of water were added to a reactor vessel and agitated. Nitrogen gas was bubbled through the resulting slurry at 5 cu ft/hr (CFH). Concentrated $H_2SO_4$ (5 ml) was added, then 594.7 g of cobalt sulfate, and the slurry was agitated moderately for 60 minutes.

A solution containing 7.2 kg of NaOH in 15 l water was added under agitation. This was followed by addition of a solution containing 1.82 kg ferrous sulfate and 5 ml concentrated sulfuric acid in 4 l water, and the slurry was heated to 190° F. for 1 hour. The slurry was then allowed to cool; the solids were recovered by filtration, and washed with water. The wet filter cake was placed into a rotary kiln fitted with baffles and dried at 225° F. for 3 hours under nitrogen gas at 8 CFH.

B. The procedure set forth in paragraph A was repeated using varying concentrations of zinc acetate in the ferric sulfate containing solution. In four separate preparations, 36.7 g, 73.5 g, 147 g, and 294 g of zinc acetate were added; these amounts correspond to 0.25%, 0.5%, 1.0% and 2.0% zinc in the product respectively.

C. The dry powders and tape draw-downs obtained from the preparations in paragraphs A and B were analyzed in a vibrating sample magnetometer (VSM) for powder squareness, coercivity, and saturation magnetization. The results are given in Table 1. The amounts of iron(II) and cobalt(II) were calculated to result in a content of 5 At% for each of these ions in all cases.

TABLE 1

| At % Zinc | Powder Magnetics $H_{App}$ = 7.3 KOe DC | | | Tape Magnetics $H_{App}$ = 5 KOe DC | |
|---|---|---|---|---|---|
| | Sigma (emu/g) | Sq | Hc (Oe) | Sq | Hc (Oe) |
| 0 (control) | 75 | 0.47 | 700 | 0.80 | 700 |
| 0.25 | 76 | 0.47 | 684 | 0.80 | 695 |
| 0.50 | 78 | 0.48 | 690 | 0.80 | 710 |
| 1.0 | 78 | 0.47 | 595 | 0.78 | 615 |
| 2.0 | 78 | 0.46 | 474 | 0.75 | 500 |

These results show that the magnetic saturation is increased to 78 emu/g while maintaining the squareness and coercivity in an acceptable range. No appreciable change in these latter properties occurs with the inclusion of 0.5 At% zinc; increasing the amount of zinc ion results in a slightly higher sigma value, with acceptable changes in squareness and coercivity.

Similar changes in sigma could theoretically be made by mimicking the composition of magnetite - i.e., increasing the At% of iron(II) precipitated. This has the disadvantage, if used in a commercial context, of conferring added instability problems on the resulting medium. However to verify this theoretical prediction, preparations similar to those in Table I were made using no zinc and 5 At% cobalt(II), but 8 At% iron(II) and 16 At% iron(II). Both of these increased amounts of iron dramatically increased the coercivity to approximately 900 Oe, and resulted in squareness values of about 0.78-0.77. The sigma values obtained were 75 emu/g for 8 At% iron(II) (the same as that obtained with 5 At% iron(II) without zinc) and 78 for 16% iron(II). Therefore, not until the composition of magnetite (16 At% iron(II)) is approached does the saturated magnetization reach that achievable by the addition of small amounts of zinc ion. The method of the invention thus provides an alternative method to achieve this enhanced property, without the attendant stability problems.

In summary, providing a small percentage of zinc ion in a precipitated epitaxial layer of iron and cobalt oxides on acicular magnetic particles results in enhancement of magnetic saturation without objectionable interference with other desirable properties.

We claim:

1. A magnetic recording medium having superior saturation magnetization properties comprising:
   a magnetic particulate pigment, with superior saturation magnetization, comprising a magnetic core and an epitaxial coating, wherein said coating comprises an inner layer of cobalt(II) hydroxide enveloped by an outer layer of iron(II) hydroxide,
   at least one of said layers impregnated with a saturation magnetization enhancing amount of zinc ion.

2. The medium of claim 1 wherein the saturation enhancing amount of zinc ion is between about 0.05 At% and 2 At%.

3. The medium of claim 2 wherein the saturation enhancing amount of zinc ion is between about 0.25 At% and 1 At%.

4. The medium of claim 3 wherein the saturation enhancing amount of zinc ion is about 0.5 At%.

5. The medium of claim 1 wherein the core is an acicular $\gamma$-$Fe_2O_3$.

6. The medium of claim 1 wherein the epitaxial cobalt and iron ion is each between about 2 At% and 10 At% of the pigment.

7. A magnetic particulate pigment with superior saturation magnetization comprising:
   a magnetic core, and an epitaxial coating,
   wherein said coating comprises an inner layer of cobalt(II) hydroxide enveloped by an outer layer of iron(II) hydroxide,
   at least one of said layers impregnated with a saturation magnetization enhancing amount of zinc ion.

8. A process for preparing a magnetic medium which comprises coating a support with the pigment of claim 7.

9. A process for enhancing the saturation magnetization of a magnetic particulate pigment which process comprises
   (a) suspending magnetic particles in aqueous medium:
   (b) precipitating cobalt(II) hydroxide onto the particles, followed by
   (c) precipitating iron(II) hydroxide onto the particles,
   wherein the improvement comprises conducting at least one of step (b) or step (c) in the presence of a saturation magnetization enhancing amount of zinc ion.

10. The process of claim 9 wherein the step conducted in the presence of zinc ion is step (c).

11. The process of claim 9 wherein the magnetic particles are acicular $\gamma$-$Fe_2O_3$.

12. The process of claim 9 which further includes curing the particles with heat, recovering the particles from the slurry and drying.

13. The process of claim 9 wherein the saturation magnetization enhancing amount of zinc ion is between about 0.05% and 2.0 At% of the pigment.

14. The process of claim 9 wherein the saturation enhancing amount of zinc ion is between about 0.25% and 1 At% of the pigment.

15. The process of claim 9 wherein the saturation enhancing amount of zinc ion is approximately 0.5 At% of the pigment.

16. The process of claim 9 wherein the cobalt(II) and iron(II) are each provided in an amount between about 2 At% and 10 At% of the pigment.

17. A magnetic pigment prepared by the process of claim 9.

* * * * *